US 8,640,245 B2

(12) United States Patent
Zaitsev et al.

(10) Patent No.: US 8,640,245 B2
(45) Date of Patent: Jan. 28, 2014

(54) OPTIMIZATION OF ANTI-MALWARE PROCESSING BY AUTOMATED CORRECTION OF DETECTION RULES

(75) Inventors: Oleg V. Zaitsev, Smolensk (RU); Yuri Mashevsky, Moscow (RU); Nikolay Denishchenko, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 437 days.

(21) Appl. No.: 12/978,453

(22) Filed: Dec. 24, 2010

(65) Prior Publication Data
US 2012/0167219 A1    Jun. 28, 2012

(51) Int. Cl.
H04L 29/06    (2006.01)

(52) U.S. Cl.
USPC ........................................................ 726/25

(58) Field of Classification Search
None
See application file for complete search history.

(56) References Cited

U.S. PATENT DOCUMENTS

| | | | |
|---|---|---|---|
| 7,231,637 B1 * | 6/2007 | McEwan ....................... | 717/171 |
| 7,237,008 B1 | 6/2007 | Tarbotton et al. | |
| 7,290,282 B1 | 10/2007 | Renert et al. | |
| 7,334,005 B2 * | 2/2008 | Sobel ................................. | 1/1 |
| 7,370,361 B2 | 5/2008 | de los Santos et al. | |
| 7,530,106 B1 | 5/2009 | Zaitsev | |
| 7,640,589 B1 | 12/2009 | Mashevsky | |
| 7,757,292 B1 * | 7/2010 | Renert et al. ..................... | 726/24 |
| 7,953,969 B2 * | 5/2011 | Neystadt et al. ............... | 713/155 |
| 8,087,086 B1 * | 12/2011 | Lai et al. .......................... | 726/24 |
| 8,356,354 B2 * | 1/2013 | Nazarov .......................... | 726/25 |
| 2003/0065926 A1 | 4/2003 | Schultz | |
| 2004/0020541 A1 | 2/2004 | Tran | |
| 2007/0143851 A1 | 6/2007 | Nicodemus | |
| 2007/0220043 A1 | 9/2007 | Oliver et al. | |
| 2007/0300286 A1 | 12/2007 | Judge | |
| 2007/0300300 A1 | 12/2007 | Guo et al. | |
| 2010/0083376 A1 * | 4/2010 | Pereira et al. .................... | 726/22 |
| 2011/0126286 A1 * | 5/2011 | Nazarov .......................... | 726/24 |
| 2011/0173698 A1 * | 7/2011 | Polyakov et al. ............... | 726/23 |
| 2013/0111591 A1 * | 5/2013 | Topan et al. ..................... | 726/24 |
| 2013/0139265 A1 * | 5/2013 | Romanenko et al. ........... | 726/24 |

FOREIGN PATENT DOCUMENTS

WO    WO 0109298    12/2001

OTHER PUBLICATIONS

Dragos Gavrilut et al: "Malware detection using machine learning", Computer Science and Information Technology, 2009. IMCSIT '09. International Multiconference ON, IEEE, (Oct. 12, 2009), pp. 735-741.
Lunt T F et al: "Knowledge-based intrusion detection", AI Systems in Government Conference, 1989., Proceedings of the Annual Washington, DC, USA March 27-31, 1989, IEEE Comput. Soc. PR, US, (Mar. 27, 1989), pp. 102-107.
Search report in EP 11161997, dated Apr. 26, 2012.

* cited by examiner

Primary Examiner — Michael R Vaughan
(74) Attorney, Agent, or Firm — Bardmesser Law Group

(57) ABSTRACT

A system, method and computer program product for optimization of execution of anti-malware (AV) applications. A number of false-positive determinations by an AV system are reduced by correcting malware detection rules using correction coefficients. A number of malware objects detected by the AV system are increased by correction of ratings determined by the rules using correction coefficients. An automated testing of new detection rules used by the AV system is provided. The new rules having zero correction coefficients are added to the rules database and results of application of the new rules are analyzed and the rules are corrected or modified for further testing.

23 Claims, 12 Drawing Sheets

OPTIMIZATION OF ANTI-MALWARE PROCESSING BY AUTOMATED CORRECTION OF DETECTION RULES

BACKGROUND OF THE INVENTION

1. Field of the Invention

The present invention is related to anti-malware technology, and more particularly, to optimization of anti-malware processing.

2. Description of the Related Art

Detection of viruses and malware has been a concern throughout the era of the personal computer. With the growth of communication networks such as the Internet and increasing interchange of data, including the rapid growth in the use of e-mail for communications, the infection of computers through communications or file exchanges is an increasingly significant consideration. Infections take various forms, but are typically related to computer viruses, Trojan programs, or other forms of malicious code (i.e., malware).

One conventional approach to detecting viruses is signature scanning. Signature scanning systems use sample code patterns extracted from known malware code and scan for the occurrence of these patterns in other program code. A primary limitation of the signature scanning method is that only known malicious code is detected, that is, only code that matches the stored sample signatures of known malicious code is identified as being infected. All viruses or malicious code not previously identified, and all viruses or malicious code created after the last update to the signature database, will not be detected.

Another virus detection strategy is integrity checking. Integrity checking systems extract a code sample from known, benign application program code. The code sample is stored, together with information from the program file, such as the executable program header and the file length, as well as the date and the time stamp of the sample. The program file is checked at regular intervals against this database to ensure that the program file has not been modified.

A main disadvantage of an integrity check-based virus detection system is that a great many warnings of virus activity issue whenever any modification of an application program is performed. It is difficult for a user to determine when a warning represents a legitimate attack on the computer system.

An effective conventional approach uses so-called white lists—the lists of known "clean" software components, links, libraries and other clean objects. In order to compare a suspect object against the white list, hash values can be used. In order to be effective, the white lists have to be constantly updated. When white lists are used, some false-positive determinations are inevitably made.

It is important to detect the false-positives, as they can cause perhaps almost as much harm as a malware. For example, a legitimate component can be "recognized" by the AV software to be malware, causing severe damage to the reputation of the AV software vendor, and annoyance and wasted time for many users. Another scenario is when a malware is mistakenly considered to be a "clean" component and harms a system. However, conventional systems do not provide an effective and robust update of the white lists based on detected false-positives.

Another conventional approach is collection and analysis of heuristic data of executable files or processes. U.S. Pat. No. 7,530,106 discloses a system for analyzing the behavior of executed files based on a set of rules. The malware is detected using ratings of computer processes calculated according to the rules. The rules are generated based on analyses of known malware processes. Each rule has a following structure: a rule identifier, an API function invoked by the rule, rule parameters and a danger level. The rule is invoked, if the process calls the API function with rule parameters. Then, a rating of the process is increased according to the rule value.

The rules are stored in updatable databases. As new viruses appear, the rule databases are updated. Creation of the new rules or modification of the old ones is an effortful and expensive task. So, it is important that the rules are tested for correctness of application. New rules can have some errors in their code (i.e., bugs) or they can generate errors when applied by an AV module during malware scanning. Thus, some rules can have zero effectiveness. These rules are stored in the rule database, but never work in the AV process. The rules with zero effectiveness may not work due to a number of factors. For example, a rule can have excessively strict (i.e., narrow) parameters, the rule can have errors or the processes detected by this rule are no longer found in the modern malware objects or applications.

The AV system uses an entire set of rules from the database for checking the suspect objects. Thus, zero effectiveness rules do not affect the overall rating, but reduce the effectiveness of the AV system. Also, these rules occupy the space in the database which makes frequent updates more difficult. Therefore, the new rules need to be tested prior to being applied in the AV system. Conventional systems, however, do not offer automatic testing of the new rules.

Any AV system has a probability of errors raised during its operation. The errors can be of two types. The errors of the first type occur if the AV system detects a malware object when this object is actually harmless. In other words, the system produces a false-positive determination. A second type of error occurs when the AV system does not detect a real malware object. In order to make the AV system more efficient, it is necessary to reduce a probability of both types of errors.

Accordingly, there is a need in the art for an optimized system and method that addresses the need for testing and automatic correction of the rules used in AV processing.

SUMMARY OF THE INVENTION

The present invention is intended as a method and system for optimization of anti-malware (AV) processing that substantially obviates one or several of the disadvantages of the related art.

According to an exemplary embodiment, there is provided a system, method and computer program product for optimization of AV processing. In one embodiment, a number of false-positive determinations by an AV system are reduced by correcting detection rules using correction coefficients. In another exemplary embodiment, a number of malware objects detected by an AV system are increased by correction of ratings determined by the rules using correction coefficients.

In yet another exemplary embodiment, an automated testing of new detection rules used by the AV system is provided. The new rules having zero correction coefficients are added to the rules database and results of application of the new rules are analyzed and the rules are corrected or modified for further testing.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for optimization of AV processing is provided. The proposed method and system provide for minimization of false-positive determinations, for increase in a number of detected malware objects and for automated testing of the detection rules.

In one aspect of the invention there is provided a system, method and computer program product for reducing a number of false-positive determinations by an AV system by modifying ratings set by detection rules using correction coefficients. In another exemplary embodiment, a number of malware objects detected by an AV system are increased by correction of ratings determined by the rules using correction coefficients.

In yet another exemplary embodiment, an automated testing of new detection rules used by the AV system is provided. The new rules having "zero" correction coefficients are added to a rule database and results of application of the new rules are analyzed. Then the rules are corrected or modified for further testing.

According to the exemplary embodiment, use of process rating allows for an increase in a number of malware objects detected by the AV system and for a decrease in a number of false-positive determinations. Thus, when a number of correctly detected objects are increased and a number of false-positive determinations are decreased, the probability of both types of errors is reduced.

As used herein, an object is the code that is stored in nonvolatile memory (e.g., on a hard disk), and the process is the code loaded into memory for execution. A malicious object results in a malicious process.

Thus, an optimized AV system that increases a number of detected malware objects using process rating is desired. It is apparent that a system with automated testing and correction of the new rules is desired as well. It is also desired to make a decision whether to store the new rule into a database based on the test results.

Figure 1:
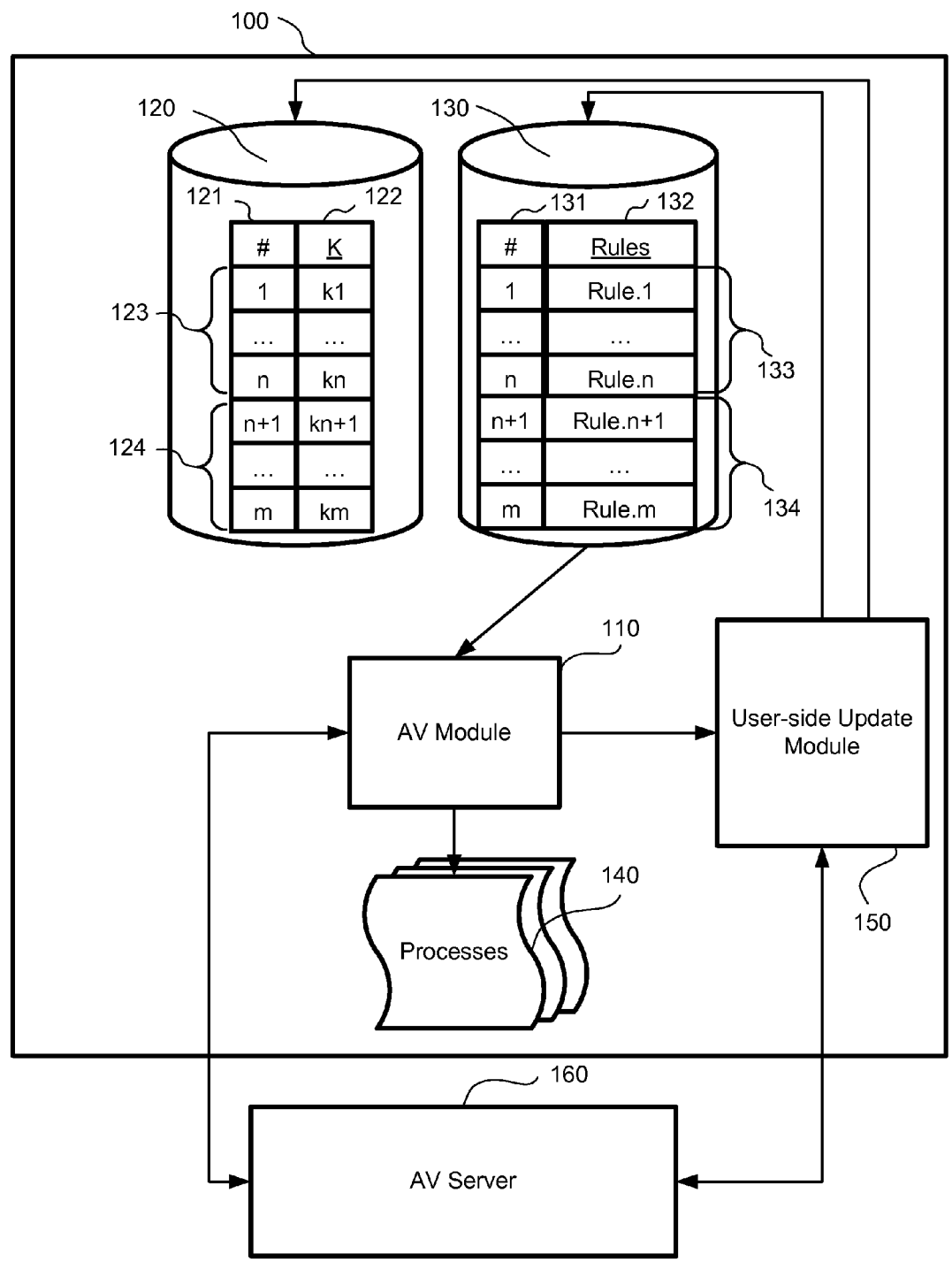
FIG. 1 illustrates a user side architecture of an AV system, in accordance with the exemplary embodiment.

FIG. 1 illustrates user side architecture of an AV system, in accordance with the exemplary embodiment. An exemplary system includes a user computer 100 connected to an AV server 160.

The user computer 100 has an AV module 110 installed on it. The AV module 110 scans the user computer 100 for malware objects (for example, executable files that launch malicious processes). The AV module 110 checks the processes 140 instantiated by the objects. In order to check the processes 140, the AV module 110 uses a set of rules 132 from a rule database 130 located on the user side. The rules 132 contain descriptions of known harmful processes. Each rule 132 has an assigned unique number 131.

The user computer 100 also has a database 120 of correction coefficients 122. The correction coefficients 120 are also used by the AV module 110 for detection of malware objects. Each rule 132 has a corresponding coefficient 122 in the database 120. Each coefficient 122 has an assigned number 121 corresponding to the rule 131. The databases 120 and 130 can be updated on the user side by an update module 150.

New rules 134 (required to be tested) are placed into the rules database 130. The database 130 contains new rules 134 that need to be tested as well as already tested rules 133 that are being used by the AV module 110. The new rules are provided to the AV module 110 for testing. The coefficients database 120 is also divided into two parts: coefficients 123 corresponding to the already tested rules 133 and coefficients 124 corresponding to the new rules 134 that need to be tested.

The AV module 110 is connected to the update module 150 and starts the update module 150 prior to AV scan of the user computer. The update module 150 connects to a server 160 update module 280 (see FIG. 2) and provides information about versions of the databases 120 and 130. The update module 280 compares the database versions with the versions of available databases on the server 160. If the server update module 280 determines that a newer version of a database is available, this version is transferred to the user update module 150, which replaces the databases 120 and 130 by newer versions. Note that the databases 120 and 130 are updated independently.

The coefficients database 120 has a much smaller size than the rules database 130. This allows for frequent updates of coefficients without noticeable overload of a network. Thus, independent update of these databases allows for reduction of network overhead.

The AV module 110 connects to the AV server 160, if it detects a malicious process and corresponding malware object. The AV module 110 terminates the malicious process. When the process is launched, the AV module starts analyzing it. As a result, an aggregate process rating is formed, which indicates whether the object is malicious. To form the aggregate process rating, rule ratings, static rating and current rating are used. The current rating is generated on the AV server, and at the beginning of the analysis of the process, the AV module sends a control sum of the object to the AV server, and receives back a current rating.

As noted earlier, the AV module 110 generates a checksum (or digest) of a detected malware object using hash functions, such as, for example, MD5, MD4, SHA1, SHA256 or CRC32. Then, the AV module 110 sends the checksum and information about the detection rules (their numbers and their own ratings, i.e., the ratings set by the rules) used to detect the malware object and an aggregate process rating to AV server 160.

Figure 4:
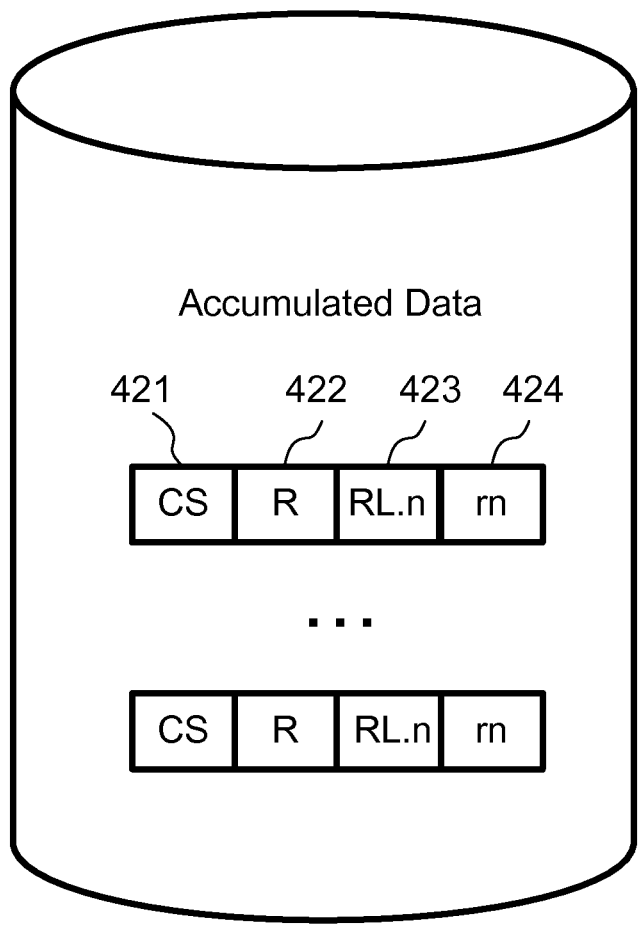
FIG. 4 illustrates structure of a data storage, in accordance with the exemplary embodiment.

The AV server 160 accumulates received data. The AV server 160 sends a response to the AV module 110. The response contains current rating of the process used in generating the aggregate process rating based on the formula $$R = \sum_{i=1}^{m} Ri * Ki + \text{static rating}(+\text{current rating}).$$

Where R is the aggregate process rating, Ri (i=1 ... m, where m is a number of the last triggered rule) is the rating of triggered rule for analyzed process, Ki is the correction coefficient corresponded to the triggered rule. If it is not possible to obtain the current rating of the process, the AV system uses the static rating. A process of generating rating is depicted in FIG. 4 and is discussed below.

According to the exemplary embodiment, there are three groups of ratings. First is the rating of a particular rule. The proposed system has a collection of rules and each rule has its own rating. When the system analyzes a process to determine whether it is malicious, some of the rules are triggered. So, for the specific rule (the one that is triggered), it is a malware process and corresponding malware object. Each rule has its own weight (i.e., rating), and the AV module aggregates all ratings of the triggered rules.

The second group is a static rating. The AV module generates the static rating for every scanned object. The static rating depends on parameters of the object such as size, type, attributes, location, etc.

The third group is the current rating that is generated by the rating generation module 320 module of the AV server 160. The report generation unit 210 receives the request and sends it to the rating generation module 320 which searches through statistics in the data storage 220. The rating generation module 320 returns an average rating (i.e., a current rating) to the user AV module 110.

Finally the AV module 110 accumulates all the ratings (the ratings of the rules, the static rating and the current rating) and generates the aggregate process rating for the scanned object (see FIG. 4). The aggregate process rating is the sum of the ratings of the rules, the static rating and the current rating.

Figure 2:
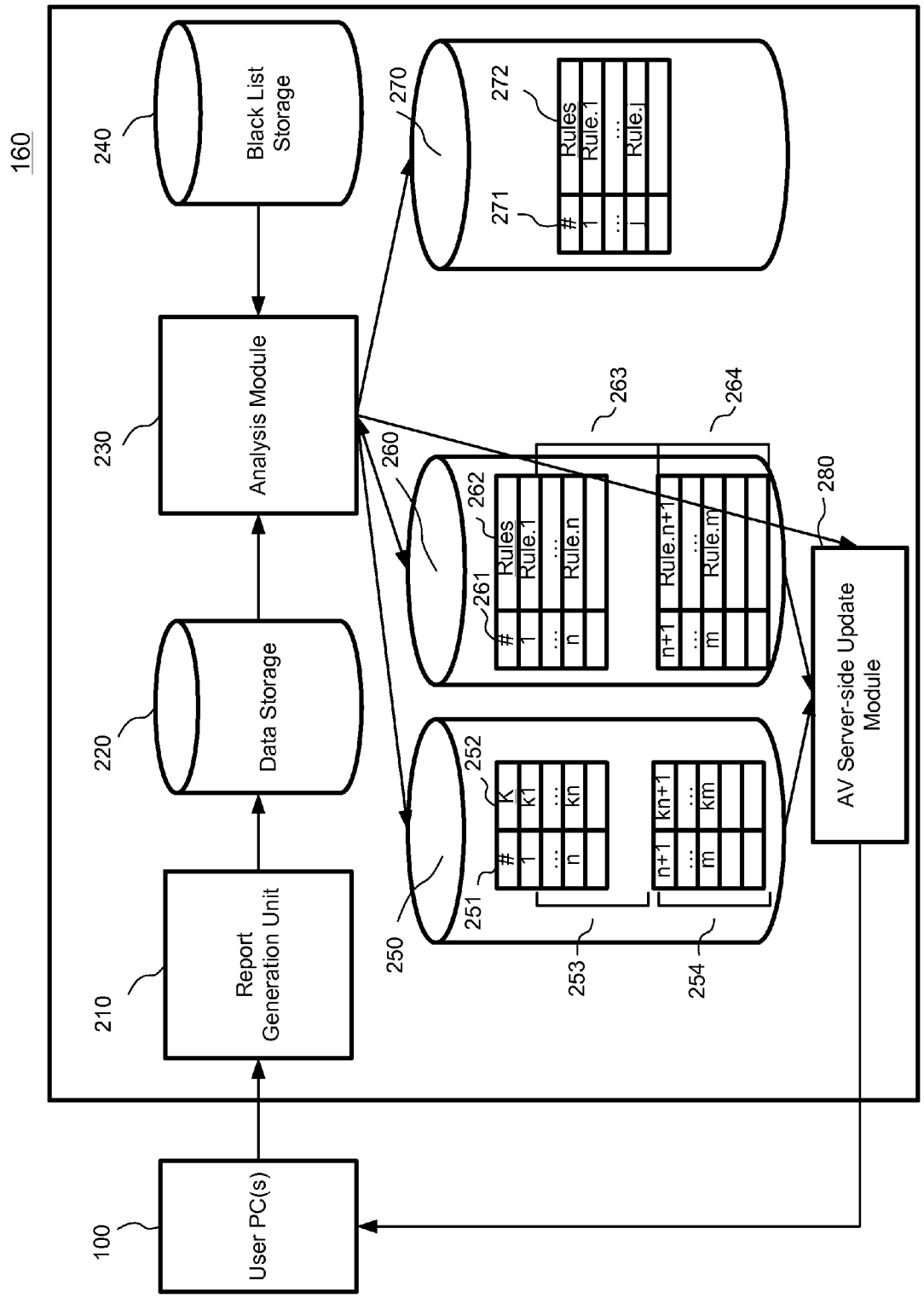
FIGS. 2 and 3 illustrate an architecture of an AV system for minimization of false-positives using detection rules and for optimization of malware detection using ratings, in accordance with the exemplary embodiment.
Figure 3:
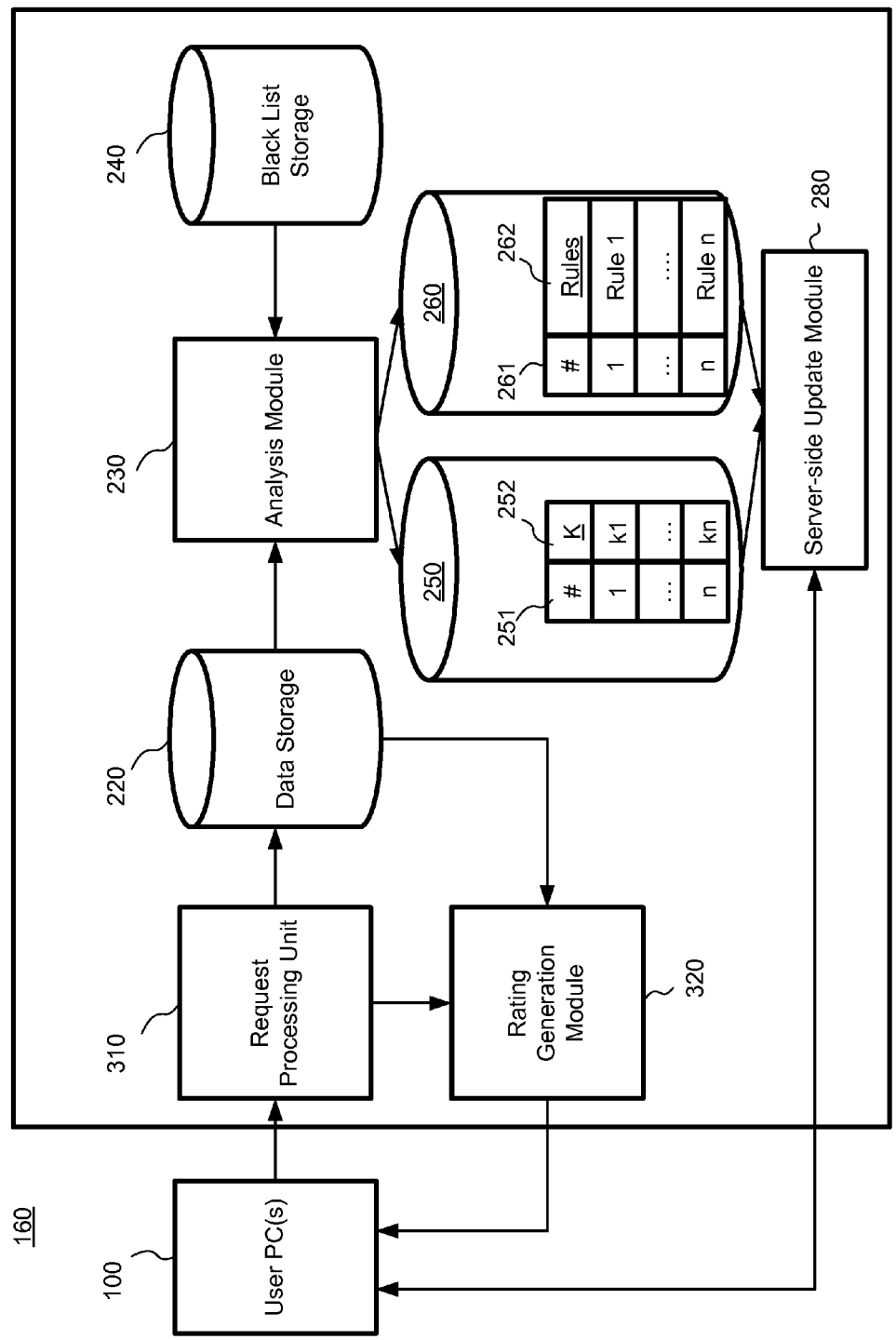

FIGS. 2 and 3 illustrate a server side architecture of an AV system for minimization of false-positives using detection rules and for optimization of malware detection using ratings, in accordance with the exemplary embodiment. The AV server 160 receives information about all detected malware objects from the user computer 100. All data is received into a report generation unit 210, which processes the data and stores into data storage 220. Analysis module 230 processes data from the data storage 220 and finds "clean" objects based on checksums 421. The analysis module 230 uses data from black list storage 240, containing checksums of known malware objects.

The analysis module 230 finds the checksums that are present in the data storage 220, but are not found in the black list storage 240. Object corresponding to these checksums are clean and thus a false-positive determination was made by the AV system with respect to these objects.

Then, the analysis module 230 analyses the rules that triggered the false-positive determination during AV processing. A number 423 of a rule defined by checksum 421 (see FIG. 4) that triggered on a "clean" object is determined. The aggregate process rating 422 of the process reflecting by how much the threshold has been exceeded and rating 424 set by each rule when generating the aggregate rating 422 are taken in consideration.

The analysis module 230 operates in two stages: performing current analysis of the false-positives and performing a full analysis of the false-positives. The current analysis is performed frequently (for example, every few hours). Based on results of the current analysis, a database of correction coefficients 250 is generated for the rules that triggered the false-positive determinations.

The coefficients are generated based on collected statistics. The system collects data into the data storage 220. Every few hours the system performs current analysis and determines if there are any "clean" objects that have been detected as malicious (by comparing the checksums). As a result, a number of rules that made false-positive determination are identified. The rules' own ratings are determined.

Then, the analysis module 230 can decrease the own ratings of the rules that made false-positive determination. Rating decrease amount depends on rating's contribution to the aggregate process rating relative to the other ratings. For example, statistics indicate that one rule often makes contributions to false-positive detection. If its rating is higher (compared with other ratings considering the correction coefficients), the rule's rating is decreased. Thus, the main goal of minimizing the number of "clean" objects detected as malware is accomplished.

Yet another main goal is not to determine malicious objects as "clean" objects. For this, the suspicious objects are analyzed. (see also discussion below regarding reducing false-positives and improving detection).

The database 250 contains only coefficients that are different from one (i.e., not equal to "1"). This minimizes the size of the database 250 that contains rule numbers 251 and corresponding correction coefficients 252. Once the database 250 is generated on the AV server 160, it is available for updates of user computers 100. The database 250 is kept at a small size (for example, approximately 500 bytes) that allows for frequent updates.

The process rating is changed using the correction coefficients 252. This prevents a false-positive determination of the "clean" objects in the future. A full analysis of false-positives is typically performed less frequently than the current analysis. In the full analysis, the analysis module 230 processes data collected over a long period of time (for example, a week). As a result of the full analysis, the analysis module 230 generates rules for a database 260.

The rules database 260 contains numbers of rules 261 and corrected rules 262. Based on the full analysis, the system can make a decision to correct the rule structure (not the coefficients) or to create a new rule (with expert's help). These rules must be tested in the same manner as the rules 264.

The base coefficient that directly affects rating set by the rule when the malware object is detected is changed. The statistics are collected in a real time mode, thus, after the coefficient changes, this is reflected in the statistics in the data storage 220. The next correction takes into consideration previous statistics, collected after the previous round of corrections.

Changes can also affect a rule structure. This procedure is performed by an expert (i.e., a person) in a semi-automatic mode.

First, the rules are tested. Initially, the coefficient is set at "0". If the rule is correct, the coefficient for modified rules equals to "1", and it can be corrected based on the results of application of the modified rules using the database 250.

After the database 260 is generated, the analysis module 230 drops correction coefficients by assigning coefficient "1" to modified rules. Thus, a correction coefficient for modified rules equals to "1" and it can be corrected based on results of application of the modified rules using the database 250. Alternatively, dropping of correction coefficients is not performed by the analysis module 230. Since the coefficients database 250 is updated frequently, the coefficients can be efficiently corrected based on the application of modified rules.

If the coefficient database 250 and the rules database 260 cannot be updated on the user side by an AV server update module 280, the latest versions are used.

Initially, detection rules are created by experts. New rules requiring testing are placed into the rules database 260. The database 260 contains new rules 264 that need to be tested and already tested rules 263 that are being used by the AV module 110. The new rules are provided to the user computer 100 for testing by the AV module 110.

The coefficients database 250 is also divided into two parts: coefficients 253 corresponding to the already tested rules 263 and coefficients 254 corresponding to the new rules 264 that need to be tested. The new rules do not affect the AV processing. Thus, the new rules do not have any input into generating of the aggregate process rating. This is achieved by the correction coefficients.

The coefficients corresponding to the rules being tested are initially set to equal zero. Then these rules have no input into aggregate rating. Therefore, all coefficients 254 equal zero, because they correspond to the new rules 264 that needed to be tested.

The AV module 110 employs the new rules 264 and results of application of these rules are provided to the server 160 and analyzed. Note that the AV module 110 employs all rules from the database 130, but the rules being tested do not affect the results of operation of the AV module 110 (due to the zero correction coefficients). However, the information about automatic application of the rules being tested (for example, a rule number and a checksum of an object that triggered the rule application) is sent to the server 160 for further analysis.

The data related to the rules that were triggered and automatically applied is provided to the report generation unit 210 that processes the data and stores it into the data storage 220. Analysis module 230 processes data from the data storage 220 and finds the checksums 421 (see FIG. 4) of the objects that triggered the tested rule. The analyses module 230 compares these checksums against the checksums of known malware objects in the black list storage 240. If the checksums match, it means that the rule had worked correctly and detected a malware object(s).

However, if a checksum in the data storage 220 does not have a matching checksum in the black list 240, it means that the rule has detected a "clean" object(s)—i.e., a false-positive determination was made by the AV system with respect to these objects. Therefore, this rule is incorrect and needs to be corrected. Also, some rules can be "zero effectiveness" rules. This means that there are no objects detected by these rules.

The analysis module 230 finds the zero effectiveness rules that did not work correctly during the AV processing. In order to find these rules, the rules database 260 is used. The analysis module 230 compares rule numbers in the database 220 with the rule numbers 261 in the database 260. The rules that have no numbers in the database 220 are the rules that have not been triggered during the AV processing—i.e., the zero effectiveness rules. Thus, the new rules are tested and the rules that do not work at all are determined.

If the test results show that the rule works correctly (i.e., detects malware objects), the analysis module 230 sets a new coefficient (instead of a zero coefficient) in the correction coefficients database 250. Thus, the rule is moved from a group of rules 264 being tested into a group 263 of already tested rules that have coefficients equal "1". Then, after the next update of the database 250, these rules will be used by the AV module 110 and will have an input into the aggregate rating.

The rules that do not pass the tests for any reason are deleted from the rules database 260 and are placed into incorrect rules database 270. Incorrect rules 272 can be reviewed and corrected by an expert. Once the rules 272 are corrected, they can be moved to the rules database 260 for another round of testing. The reason for not passing the test by a detection rule can be, for example, the rule was triggered by a "clean" object (i.e., an object that does not have a matching checksum in the blacklist 240) or the rule that had not been triggered at all by malware objects.

The exemplary embodiment addresses two main issues: when the system detects a "clean" object as malware and when the system does not detect malware object but detects it as a suspect object.

If the system detects "clean" objects, all the information about these objects is collected in the data storage 220. After that, the checksums in the data storage 220 are compared with the checksums stored in the black list storage 240 to determine the "clean" objects and the rules that have been triggered by them. Next the coefficients for the triggered rules are reduced. So, the next time these "clear" objects will not be detected by the same rules.

If a suspect object is detected (i.e., the object that is not "clean" and yet it cannot be determined as malicious), the information about these objects is collected in the data storage 220. After that, the checksums in the data storage 220 are compared with the checksums stored in the black list storage 240 to determine the malware objects and the rules that have been triggered by them. The next step is increasing coefficients for triggered rules, so the next time these suspect objects will be detected as malware.

Then, the analysis module 230 analyses the rules that allowed for a malware object to be undetected during AV processing. A number 423 of a rule defined by checksum 421 (see FIG. 4) that worked on an undetected malware object is determined. Rating 422 of the process, reflecting by how much the threshold has been undershot, and rating 424 set by each rule are taken in consideration when generating the aggregate rating.

The analysis module 230 operates in two stages: performing a current analysis of the false-positives and performing a full analysis of the false-positives. The current analysis is performed frequently (for example, every few hours). Based on results of the current analysis, a database of correction coefficients 250 is generated for the rules that allowed for undetected malware objects.

The database 250 contains only coefficients that are different from "1". This advantageously minimizes the size of the database 250 that contains rule numbers 251 and corresponding correction coefficients 252. Once the database 250 is generated on the AV server 160, it is available for updates of user computers. The database 250 is kept at a small size (approximately 500 bytes) that allows for frequent updates.

The process rating is changed using the correction coefficients 252. This prevents the malware objects from being undetected in the future. A full analysis of undetected instances is performed less frequently than the current analysis. In the full analysis, the analysis module 230 processes data collected over a long period of time (for example, a week). As a result of the full analysis, the analysis module 230 generates rules database 260. The rules database 260 contains numbers of rules 261 and corrected rules 262.

The base coefficient, that directly affects rating set by the rule when the malware object is detected, is changed. Changes can also affect a rule structure. This procedure is performed by an expert in a semi-automatic mode. After the database 260 is generated, the analysis module 230 drops correction coefficients by assigning coefficient "1" to modified rules. Thus, a correction coefficient for modified rules equals to "1" and it can be corrected based on results of application of the modified rules using the database 250.

Alternatively, dropping of correction coefficients is not performed by analysis module 230. Since the coefficients database 250 is updated frequently, the coefficients can be efficiently corrected based on the application of modified rules. If the correction coefficient database and the rules database cannot be updated on the user side by an AV server update module 280, the latest versions are used.

The rating generation module 320 receives a checksum of an object from the report generation unit 210. The rating generation module 320 finds matching checksums in the data storage 220. Then, the rating generation module 320 sends a response containing an average current rating of the object to the AV module 110. The average current rating is calculated based on rating set for a given object by different rules. The AV module 110 uses received current rating at generation of the aggregate rating of the process instantiated by the checked object. The aggregate rating is calculated base on rating set by different rules that have been applied to the object.

If the AV module 110 does not receive current rating, the static rating generated by the AV module 110 (without the AV server 160) is used only. This situation can happen if the data storage 220 does not have any data related to a suspect object.

FIG. 4 illustrates a structure of data storage, in accordance with the exemplary embodiment. The accumulated data storage 220 is a database that has tables for storing data received from the AV module 110. These tables have at least the following fields: a checksum 421 of an object, an aggregate rating 422, a number of a triggered rule 423 that worked for the object defined by the checksum 421 and rating 424 set by the rule 423.

Figure 5:
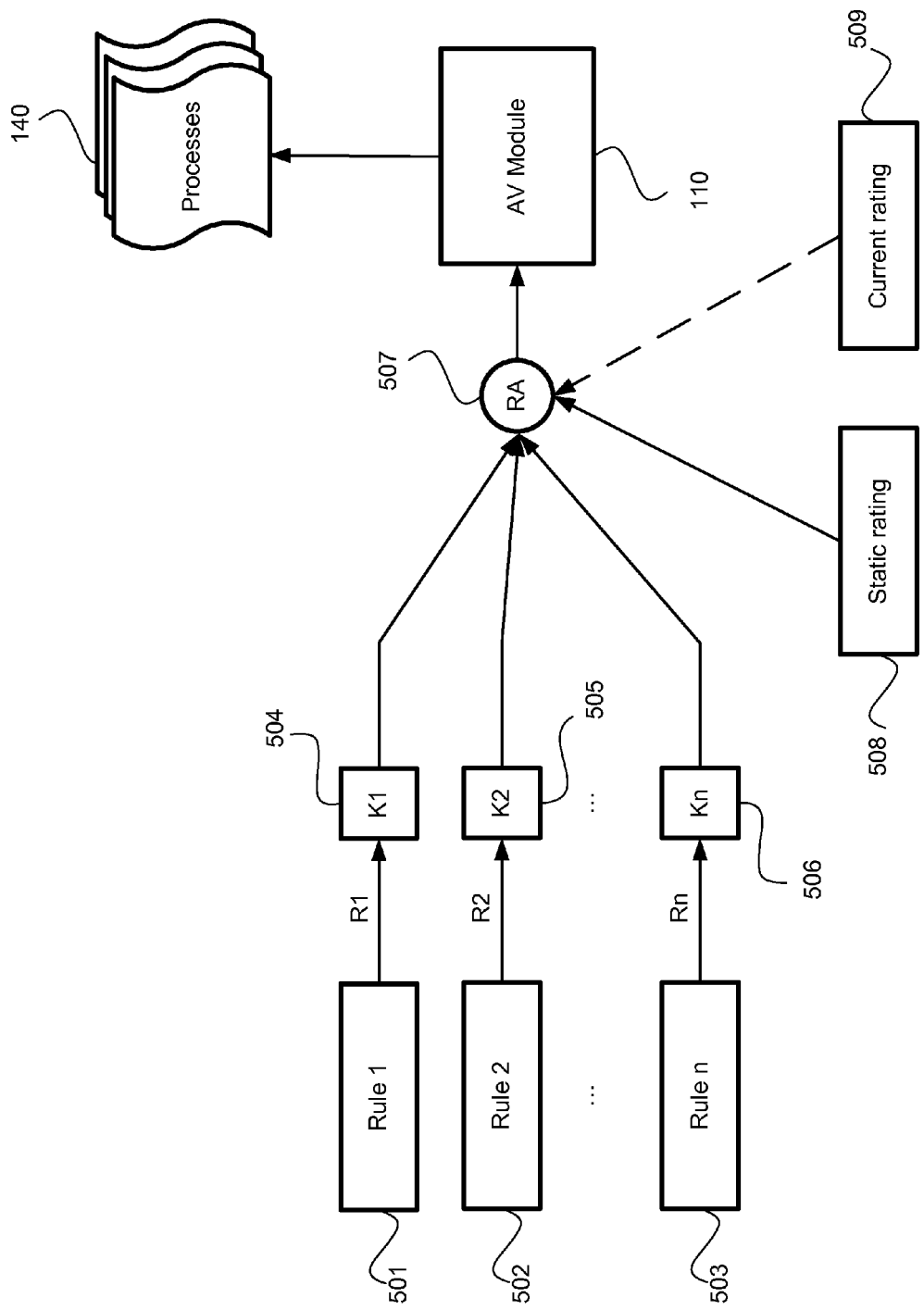
FIG. 5 illustrates a process of generating ratings, in accordance with the exemplary embodiment.

FIG. 5 illustrates a process of generating ratings, in accordance with the exemplary embodiment. The AV module 110 scans user computer 100 (FIG. 1). The AV module 110 checks running processes 140 in order to determine malware objects that instantiated these processes.

During analysis of a given process, several rules 501-503 can be automatically applied. Each rule has a basic coefficient $R_i$ ($i=1\ldots n$, where n is a number of the last rule), that can change only after modification of the rule itself (after an update of the rules database 260). The basic coefficient (associated with the rule) affects the rating set by this rule.

However, the rules database 130 is updated less frequently than the correction coefficient database 120. A resulting (i.e., aggregate) rating is generated taking into account correction coefficients 504-506 that assist in changing the rating of a particular rule in an efficient manner. The aggregate rating is also affected by a static rating 508. The static rating 508 is determined by the AV module 110 at the initial analysis of object's parameters (i.e., such as, object attributes, location, size, type, etc.).

There are four attributes of MS WINDOWS files:
(a) Read-only file attribute;
(b) Archive file attribute;
(c) System file attribute; and
(d) Hidden file attribute.

The AV module 110 produces the static rating based on the static parameters (i.e., file attributes).

In one embodiment, a current (operational) rating 509 received from the AV server 160 is used together with the static rating 508. The current rating 509 provides a more general interpretation of a threat presented by a suspect object, because the current rating 509 is generated based on object's data received from the AV means located on several user computers. Use of the current (operational) rating in AV processing is more effective. Therefore, a current rating is used whenever possible, while static rating is disregarded.

Several rules can be triggered and applied to one process. Each rule makes an input into ultimate malware detection. The input from each rule consists of two components: basic coefficient R and correction coefficient K. The inputs from each rule are summed up and combined with the static rating 508 or the current rating 509 to create an aggregate process rating 507.

If the aggregate process rating exceeds a danger threshold 1150 (see FIG. 11), the process is dangerous and the corresponding object is malware. Note that all of the thresholds are relative values. They depend on ratings and coefficients. The danger threshold is fixed (greater than 75%, for example). The safety threshold is also fixed and could be less than 50% (for example). Suspect objects thresholds are between these thresholds.

The rules typically define a percentage-based rating for a particular process. For instance, a particular rule is triggered, and it gives a 20% rating to a process. The coefficient will affect the rating (for example, in the range of 0 to 5).

$K=0$—for the rule being tested ($20\%*0=0$);

$K=(0-1)$—for rules that result in appearance of false-positives ($20\%*0.5=10\%$—the rating is reduced);

$K=1$—that do not need to change ($20\%*1=20\%$—no change);

$K=(1-5)$—for cases when the rule works with no errors, therefore, the final rule rating increases and the object is no longer suspicious, but is now classified as malicious ($20\%*4=80\%$—rating increases, the object is malicious).

If a safety threshold 1140 is not reached, an object is considered "clean." If the aggregate rating falls between the thresholds 1140 and 1150, the object is considered suspicious.

The correction coefficients 504-506 change the rating set by a particular rule. Therefore, if a rule is triggered by malware objects that do not have a rating reaching the threshold, the coefficient of this rule can be increased. Then, the input of this rule into the aggregate rating 507 is increased. Consequently, a number of detected malware objects is increased by the objects that previously had lower rating and had been detected only as suspicious. A number of detected malware objects also increases as the rules database is updated (when basic coefficient or rule structure are changed). In this case, the rating R set by the rule is corrected so that the rule provides a larger input when triggered by the malware objects.

The coefficients are determined based on results of the statistics, received when working with the particular rule and the selected coefficient. The statistics are gathered by module 220 over some period (e.g., several hours) and are analyzed by module 230. For example, consider a case when 1000 results for a particular rule are received with a coefficient K=3, of which 5 are false-positives. The coefficient K is changed to 2.

After another hour, 1000 more results are received, with 2 false-positives. The coefficient is changed to 1, and so on.

In another example, over the course of an hour, 1000 results for a particular rule are received with K=1, and with 10 suspicious objects, which based on analysis by module 230 are in the blacklist 240 (in other words, the object are not suspicious, but are in fact malicious). For suspicious objects, the rating was from 50% to 75%. In this case, the module 230 raises to the coefficient to K=1.5.

After another hour, only 5 objects are identified that are suspicious (which are in fact malicious). The coefficient K is increased to 2, and so on.

If a rule is often triggered by "clean" objects, the coefficient of this rule can be reduced. Note that in this case, the coefficient changes, while the rule itself can remain the same, since it is sufficient to update just the coefficients database to effect the changes. Thus, the input of this rule into the aggregate rating 507 is minimized and a number of false-positives caused by this rule are reduced. Use of the correction coefficients on the entire set of rules reduces the overall number of false-positives in the AV system.

Figure 6:
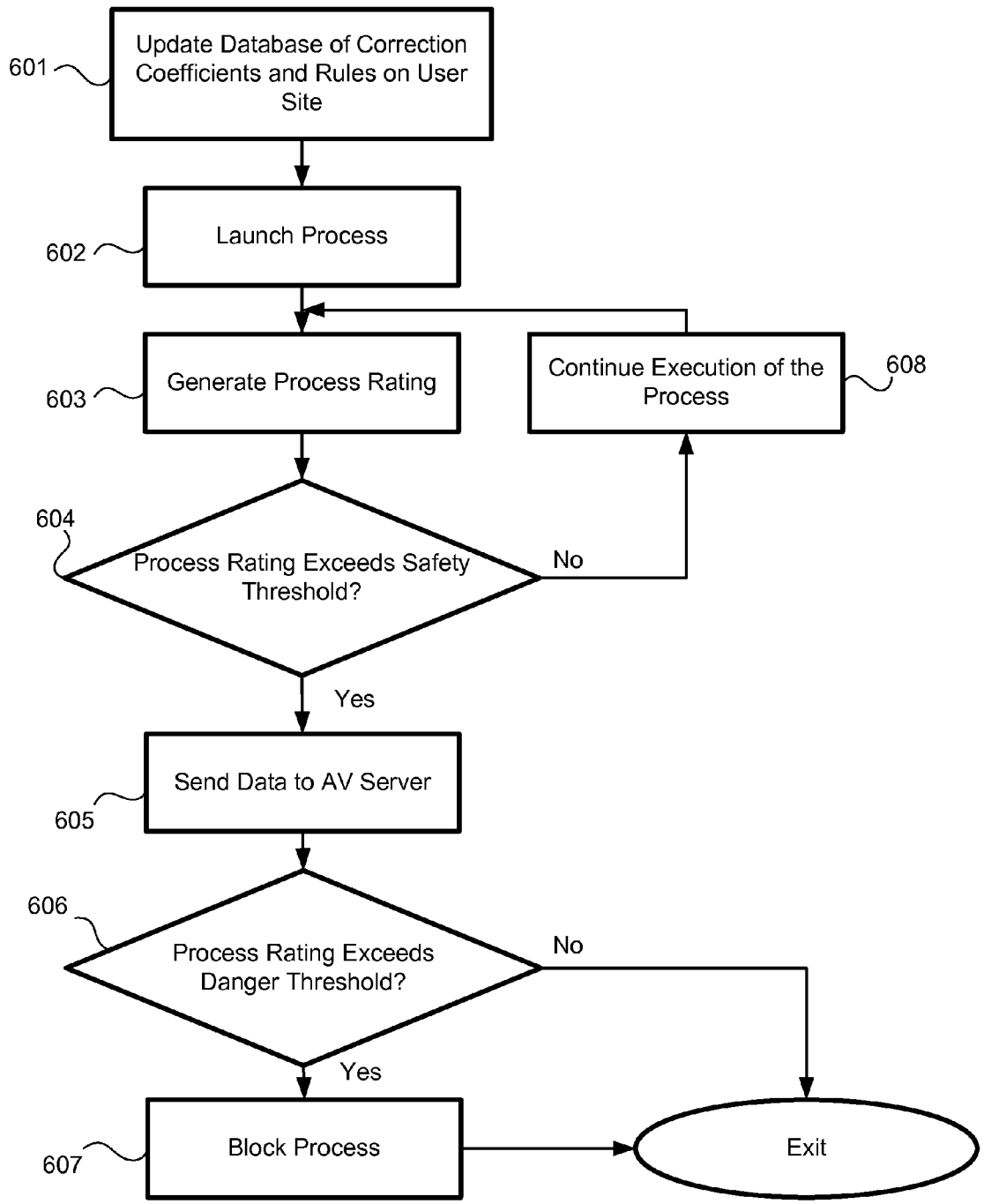
FIG. 6 illustrates a block diagram of AV processing algorithm based on process rating, in accordance with the exemplary embodiment.

FIG. 6 illustrates a block diagram of an AV processing algorithm based on process rating, in accordance with the exemplary embodiment. The databases of correction coefficients and rules are updated on a user side in step 601. A process is launched in step 602 and the process rating is generated in step 603. If it is determined in step 604 that the process rating exceeds the safety threshold, the process-related data is sent to the AV server in step 605. Otherwise, execution of the process is continued in step 609. If, in step 606, it is determined that the process rating exceeds the danger threshold, the process-related data is sent to the AV server in step 607 (for example, a checksum 421 of an object, an aggregate rating 422, a number of a triggered rule 423 that worked for the object defined by the checksum 421 and rating 424 set by the rule 423). After that the process is blocked in step 608. Otherwise, the analysis of the process is completed.

Figure 7:
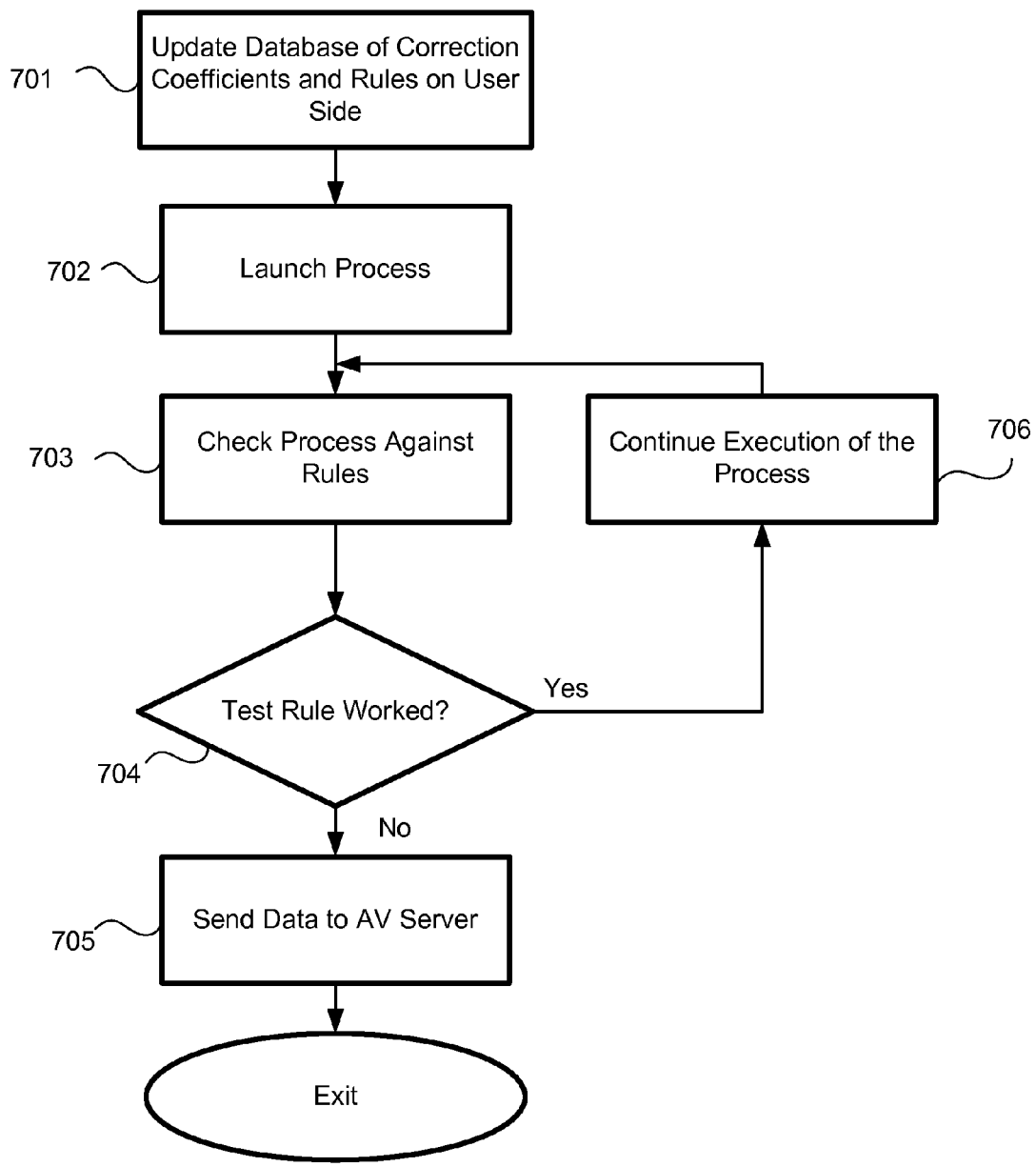
FIG. 7 illustrates a block diagram of an algorithm for testing detection rules, in accordance with the exemplary embodiment.

FIG. 7 illustrates a block diagram of an algorithm for testing detection rules, in accordance with the exemplary embodiment. The database of correction coefficients and rules on the user side is updated in step 701. A process is launched in step 702 and the process is checked against the rules in step 703. If the test rule triggered on the process in step 704, in step 705 the rule data is sent to the AV server for further analysis. Otherwise, the process execution is continued in step 706. The following data is sent: a checksum 421 of an object, an aggregate rating 422, a number of a triggered rule 423 that worked for the object defined by the checksum 421 and rating 424 set by the rule 423. The rules being tested have a zero correction coefficient, therefore, they do not affect the aggregate rating.

Figure 8:
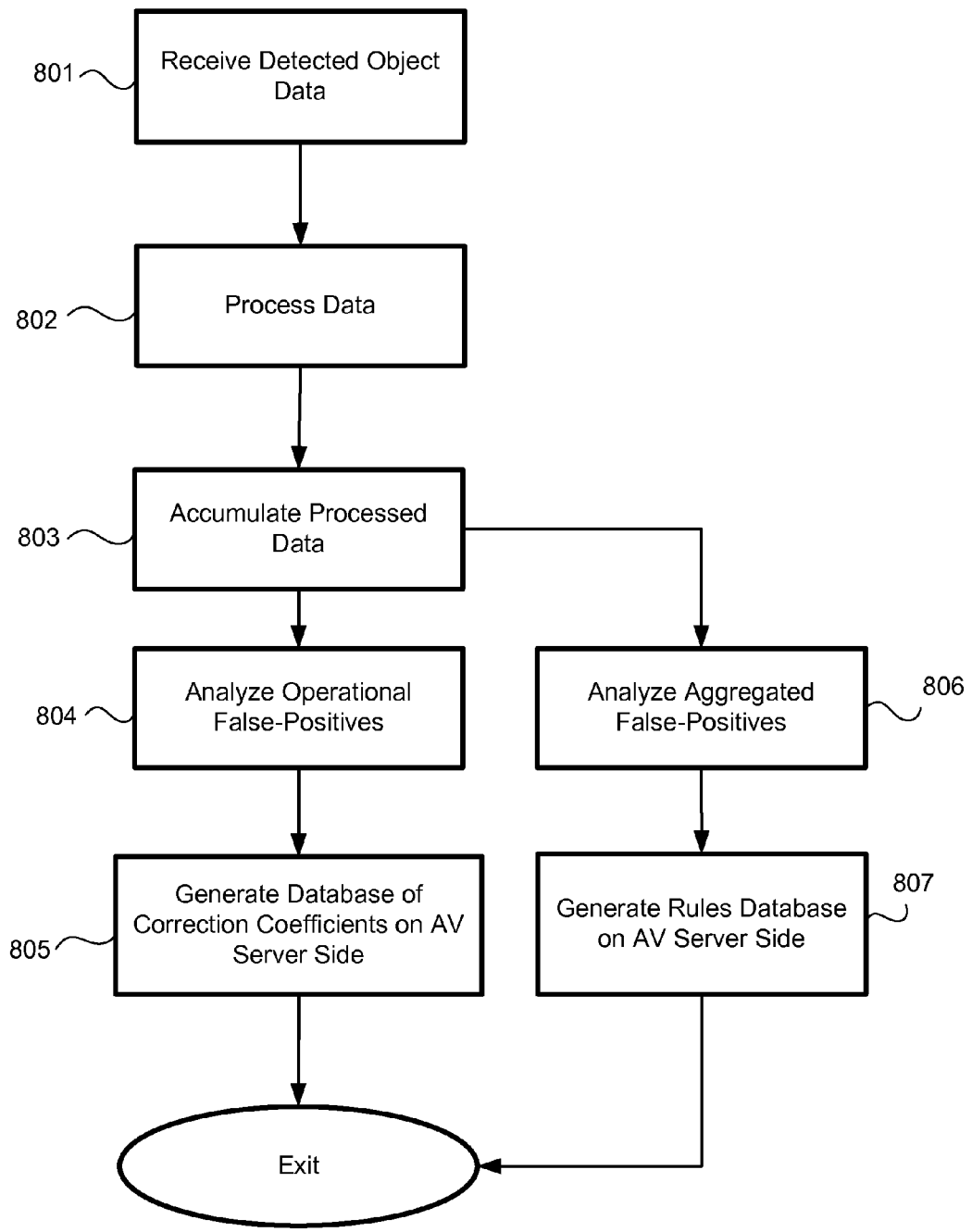
FIG. 8 illustrates a block diagram of an algorithm for minimization of false-positive determination and for optimization of malware detection, in accordance with the exemplary embodiment.

FIG. 8 illustrates a block diagram of an algorithm for minimization of false-positive determination and for optimization of malware detection, in accordance with the exemplary embodiment. In step 801, the AV server receives data about the objects identified by the AV software 110. In step 802, the received data is processed and is structured in a manner that is convenient for subsequent processing by the module 220. In step 803, the processed data is stored. With some periodicity, e.g., once every few hours, the analysis module 230 analyzes the collected data in step 804, after which the coefficients database is formed in step 805.

The analysis module 230, in step 806, analyzes the data collected over a longer period of time, for example, a week. The rules database is formed on the basis of this analysis in step 807. In step 805, the analysis module 230 renews the database of correction coefficients. At this point, the database of correction coefficients and a database of rules are both ready for loading and updates.

In step 808, the rating generation module 320 receives from the report generation unit 210 a control sum or a hash value of the object being examined. The current (operational) rating is formed based on the control sum/hash value, and is sent to the AV module on the user side, in step 809.

Figure 9:
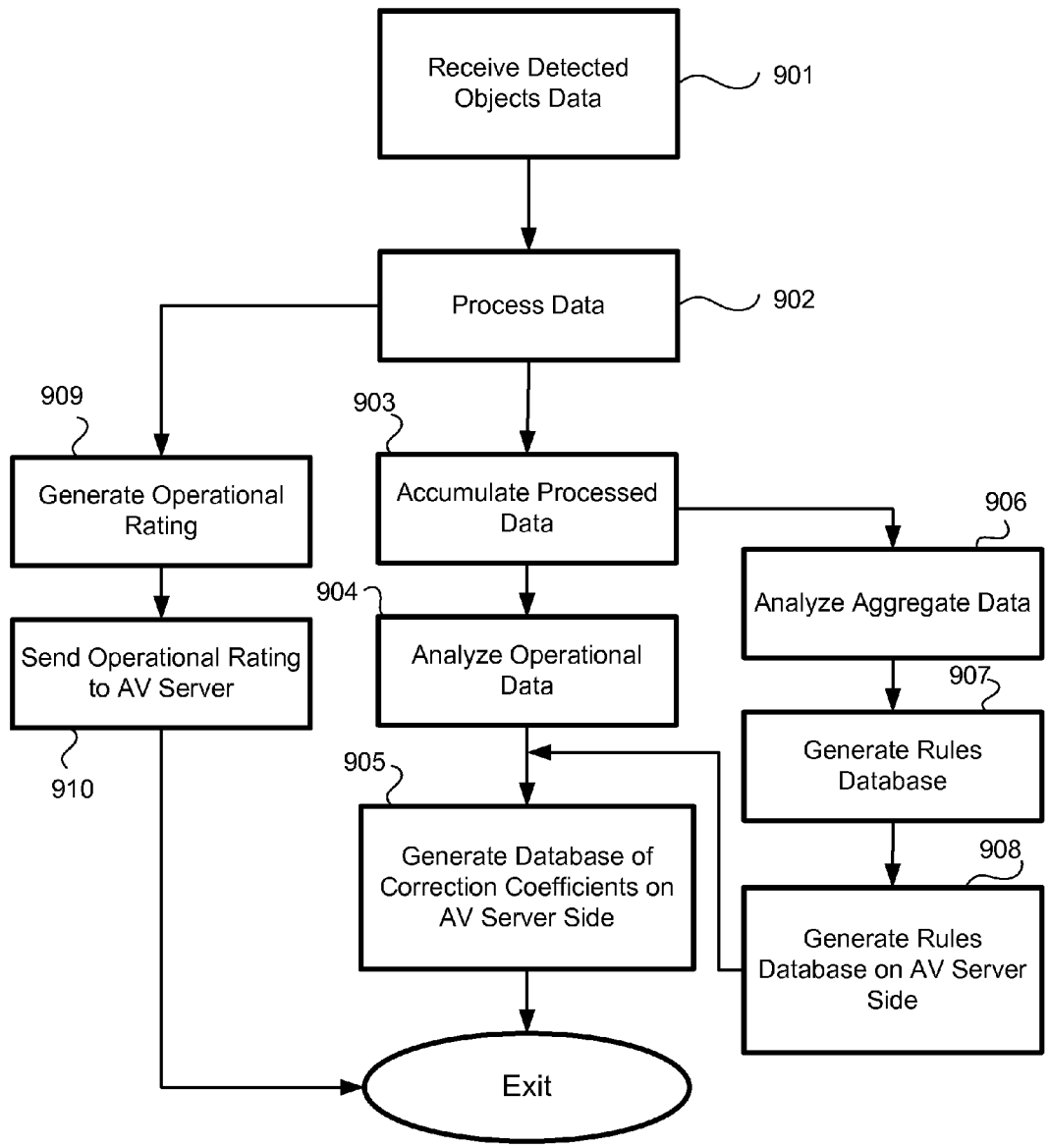
FIG. 9 illustrates an algorithm for meshing client-side and server-side data operations, in accordance with the exemplary embodiment.

FIG. 9 illustrates an algorithm for meshing client-side and server-side data operations, in accordance with the exemplary embodiment. The data relating to the detected objects is received in step 901. The data is processed in step 902 and is accumulated in step 903. The data is analyzed in step 904, and, in step 905 a database of correction coefficients is generated, and the process ends. Aggregate data is analyzed in step 906. The rules database is generated in step 907, and is stored on the server side in step 908, after which step 905 is performed. In step 909, operational ratings are generated, and in step 910, the operational rating is sent to the server.

Figure 10:
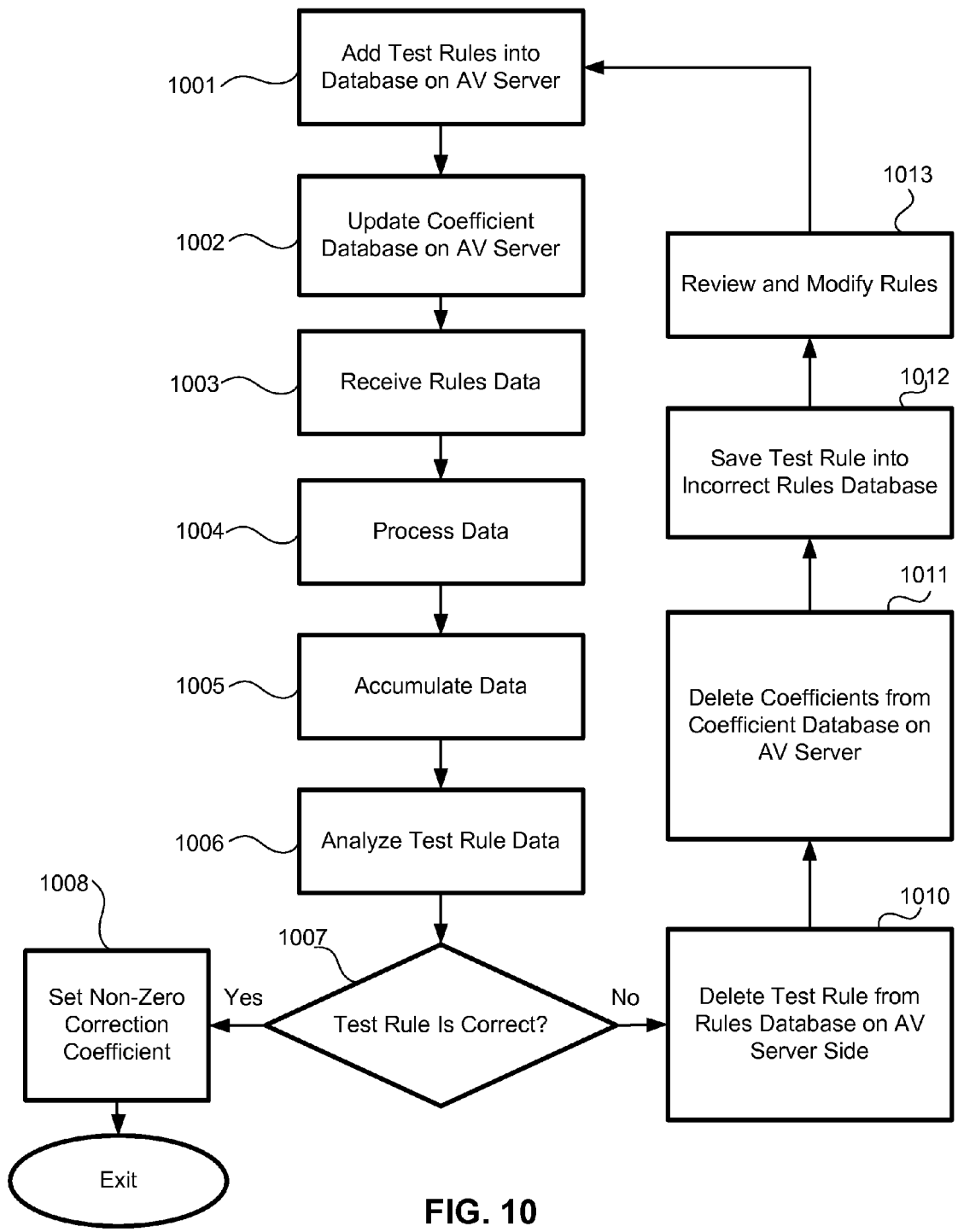
FIG. 10 illustrates a block diagram of an algorithm for automated correction of rules, in accordance with the exemplary embodiment.

FIG. 10 illustrates a block diagram of an algorithm for automated correction of rules, in accordance with the exemplary embodiment. In step 1001, a test rule is added into a database on the AV server. The coefficient database is updated on the AV server in step 1002. The correct rules data is received in step 1003 and processed in step 1004. The rule's data is accumulated in step 1005 and analyzed in step 1006. If, in step 1007, it is determined that a test rule is correct, a non-zero correction coefficient is set for this rule in step 1008.

Otherwise, in step 1010, the test rule is deleted from the rules database on the AV server. Then, the corresponding coefficient is deleted from the coefficients database on the AV server in step 1011. The test rule is saved into the incorrect rules database 270 in step 1012. In step 1013, the test rule is reviewed (by an expert) and modified. Then, in step 1001 the modified rule is added to the rules database 260 for further testing.

Figure 11:
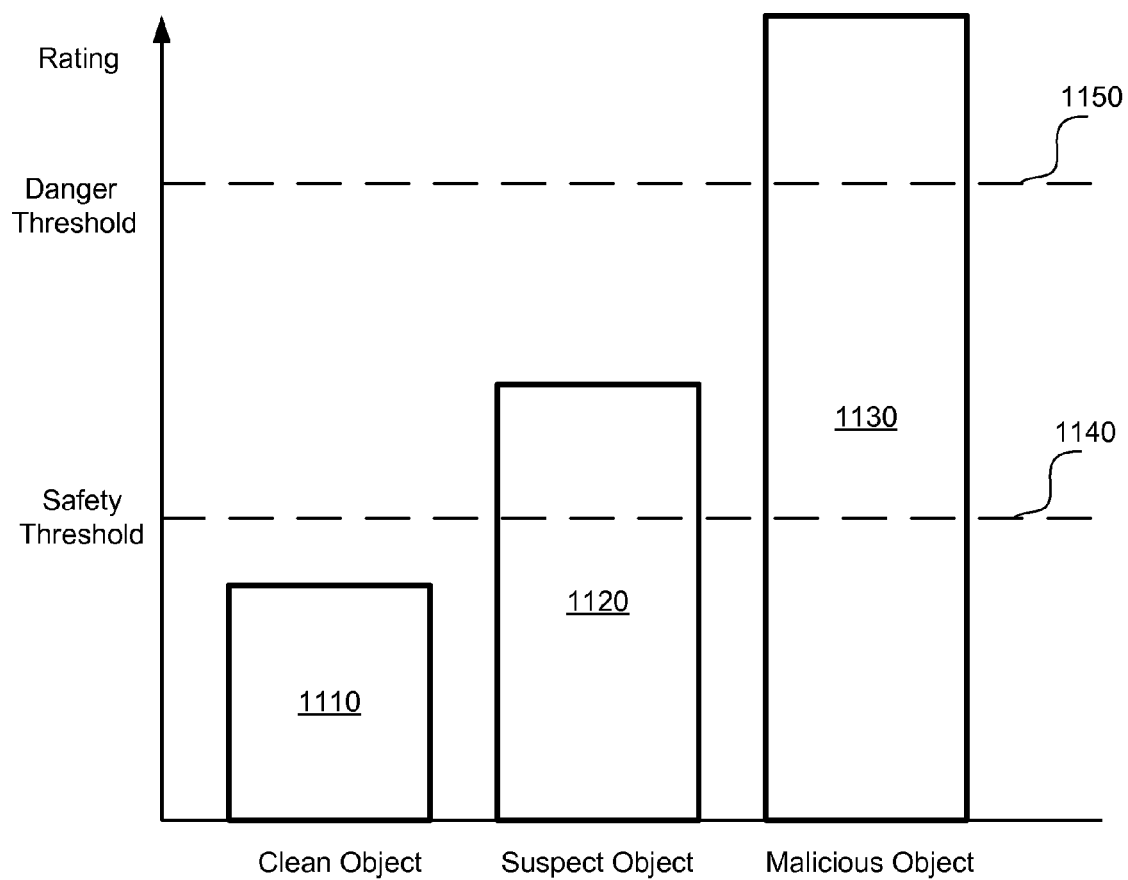
FIG. 11 illustrates classification of checked objects based on rating, in accordance with the exemplary embodiment.

FIG. 11 illustrates classification of checked objects based on rating, in accordance with the exemplary embodiment. Three situations are possible: process rating is less than a safety threshold 1140 and an object 1110 is considered "clean"; process rating exceeds the safety threshold 1140 but does not reach a danger threshold 1150 and an object 1120 is considered suspicious; and process rating exceeds the danger threshold 1150 and an object 1130 is considered dangerous (i.e., malicious).

The safety threshold 1140 is set depending on the danger threshold 1150 and can be, for example, at 50% of the danger threshold 1150. The boundaries are typically fixed, what changes is the rating coefficients and the rules. The objects are divided into three groups. Based on the actions they attempt during the process execution: malicious, clean, and suspicious. Thus, the danger threshold has a particular value (for example, 75%), which defines all malicious objects for which the rule is triggered. In other words, the anger threshold is selected based on the ratings of the rules that are triggered for the malicious objects. A similar concept applies to clean objects. All ratings below the safety threshold (e.g., 50%) define clean objects, and the safety threshold is thereby derived. The coefficients and ratings change, to ensure that false-positives and false-negatives are minimized.

Note that the preferred embodiment is directed to analyzing the suspicious objects that can be malware object despite their relatively low ratings.

Figure 12:
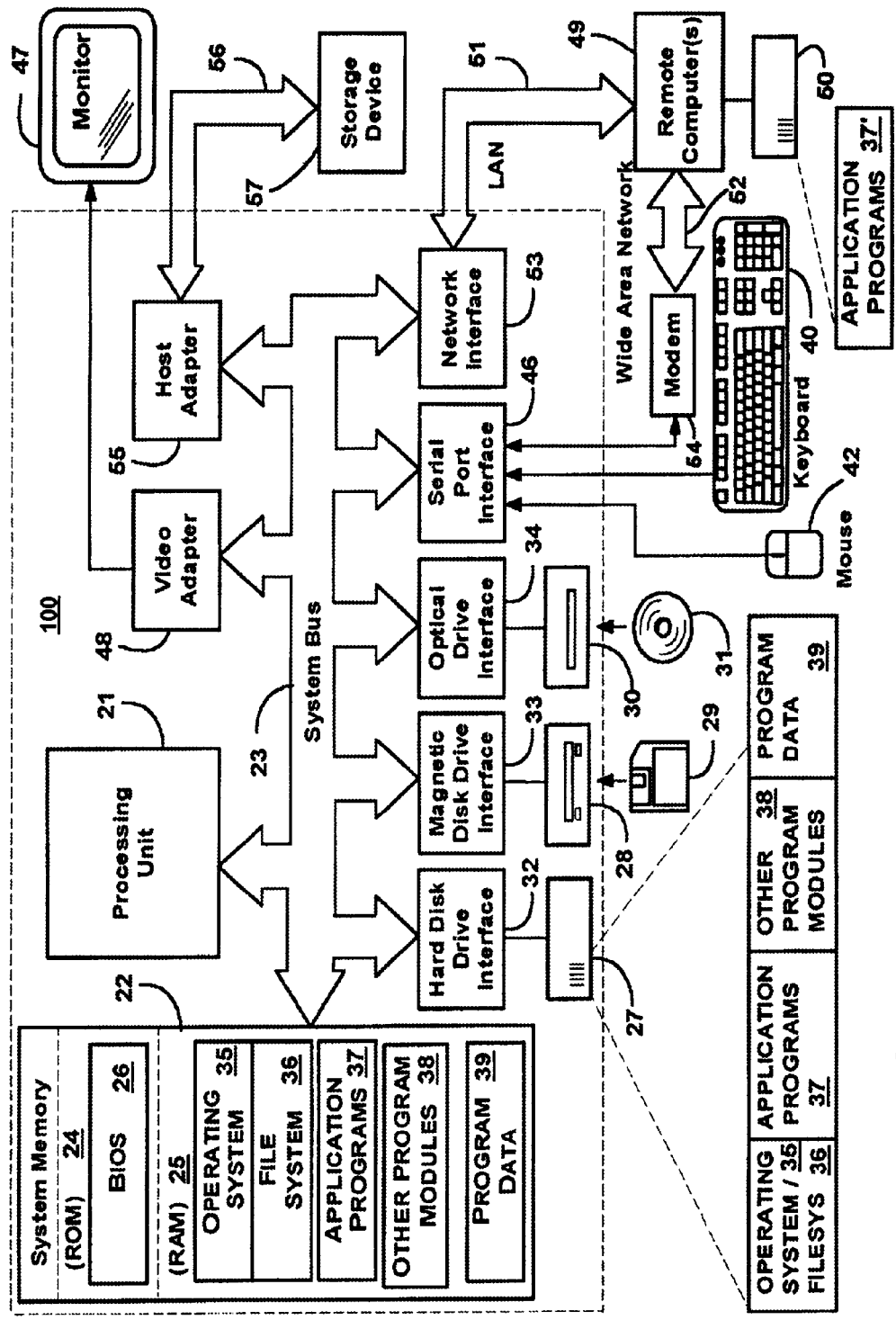
FIG. 12 illustrates a schematic of an exemplary computer system on which the invention can be implemented.

With reference to FIG. 12, an exemplary system for implementing the invention includes a general purpose computing device in the form of a computer or server 100 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 100, such as during start-up, is stored in ROM 24.

The computer 100 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 100.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 100 includes a file system 36 associated with or included within the operating system 35, one or more application programs 37, other program modules 38 and program data 39. A user may enter commands and information into the computer 100 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The computer 100 may operate in a networked environment using logical connections to one or more remote computers 49. The remote computer (or computers) 49 may be another computer, a server, a router, a network PC, a peer device or other common network node, and typically includes many or all of the elements described above relative to the computer 100, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 100 is connected to the local network 51 through a network interface or adapter 53. When used in a WAN networking environment, the computer 100 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 100, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for optimization of anti-malware processing.

It should also be appreciated that various modifications, adaptations and alternative embodiments thereof may be made within the scope and spirit of the present invention. The invention is further defined by the following claims.

What is claimed is:

1. A computer-implemented method for optimization of anti-virus (AV) processing, the method comprising:
    (a) creating a database of malware detection rules and a database of correction coefficients on an AV server, wherein the detection rules include test rules having zero correction coefficients;
    (b) updating a user-side database of malware detection rules and a user-side database of correction coefficients with current data from the database of malware detection rules and the database of correction coefficients on the AV server;
    (c) receiving, from users running user processes, at the AV server, data related to the user processes, if the process aggregate rating exceeds a safety threshold but is below a danger threshold;
    (d) accumulating received data related to the user process on an AV server data storage;
    (e) analyzing false-negative determinations; and
    (f) updating the database of correction coefficients on the AV server based on the aggregate false-negative determinations, including updating at least some coefficients of the test rules to be non-zero coefficients to convert corresponding test rules into detection rules.

2. The method of claim 1, wherein the false-negative determination is made when a checksum of the detected suspicious object in an AV server data storage have a matching checksum of the known malware objects in a blacklist database.

3. The method of claim 1, further comprising receiving, from the AV server, a current rating of a user process.

4. The method of claim 3, wherein the current rating is determined based on data related to the process received from several users.

5. The method of claim 1, wherein the data related to the process comprises at least a checksum of the object corresponding to the user process, an aggregate rating of the process, a number of a triggered rule and rating set by the rule.

6. The method of claim 1, wherein the aggregate process rating is generated based at least on application of the detection rules to the user process, the correction coefficients for the detection rules, the static rating and the current rating.

7. The method of claim 6, wherein the static rating is determined based on parameters of the object corresponding to the user process, the parameters comprising at least object attributes, object location, object type and object size.

8. The method of claim 1, wherein the correction coefficients change a rating set by the rules.

9. The method of claim 1, further comprising receiving the data related to the process by the AV server for further analyses, if at least one of the test rules is triggered by the user process.

10. The method of claim 9, further comprising deleting the test rule from the rules database and saving it into an incorrect rules database for further review, if the test rule was triggered incorrectly.

11. The method of claim 9, further comprising deleting the correction coefficients corresponding to the test rule that was triggered incorrectly.

12. The method of claim 1, wherein data collected over at least a day is used to correct the detection rules.

13. The method of claim 1, wherein the malware detection rules are only used for identification of malicious processes.

14. The method of claim 1, further comprising updating an aggregate rating of the user process based on the rules and the updated coefficients.

15. A computer-implemented method for minimization of false-positive determinations in anti-virus (AV) processing, the method comprising:
  (a) creating a database of malware detection rules and a database of correction coefficients on an AV server, wherein the detection rules include test rules having zero correction coefficients;
  (b) updating a user-side database of malware detection rules and a user-side database of correction coefficients with current data from the database of malware detection rules and the database of correction coefficients on the AV server;
  (c) receiving, from users running user processes, at the AV server, data related to the user processes, if the process aggregate rating exceeds a danger threshold;
  (d) accumulating received data related to the user process on an AV server data storage;
  (e) analyzing false-positive determinations; and
  (f) updating the database of correction coefficients for correction of ratings of the detection rules on the AV server based on the aggregate false-positive determinations, including updating at least some coefficients of the test rules to be non-zero coefficients to convert corresponding test rules into detection rules.

16. The method of claim 15, further comprising making the false-positive determination when a checksum of the detected object in the AV server data storage does not have a matching checksums of the known malware objects in a blacklist database.

17. The method of claim 15, further comprising receiving, from the AV server, a current rating of a user process.

18. The method of claim 17, wherein the current rating is determined based on data related to the process received from several users.

19. The method of claim 15, wherein the aggregate process rating is generated based at least on application of the detection rules to the user process, the correction coefficients for the detection rules, the static rating and the current rating.

20. The method of claim 19, wherein the static rating is determined based on parameters of the object corresponding to the user process, the parameters comprising at least object attributes, object location, object type and object size.

21. The method of claim 15, wherein the data related to the process comprises at least a checksum of the object corresponding to the user process, an aggregate rating of the process, a number of a triggered rule and rating set by the rule.

22. The method of claim 15, wherein the correction coefficients change a rating set by the rules.

23. The method of claim 15, wherein data collected over at least a day is used to correct the detection rules.

* * * * *